AUTOMATIC CONTROL APPARATUS FOR TELEVISION RECEIVERS

Filed July 21, 1950 2 Sheets-Sheet 1

INVENTOR.
DONALD RICHMAN

BY Everett A. Gartrell

ATTORNEY

March 30, 1954 D. RICHMAN 2,673,892

AUTOMATIC CONTROL APPARATUS FOR TELEVISION RECEIVERS

Filed July 21, 1950 2 Sheets-Sheet 2

INVENTOR.
DONALD RICHMAN
BY Everett A. Gartrell
ATTORNEY

Patented Mar. 30, 1954

2,673,892

UNITED STATES PATENT OFFICE 2,673,892

AUTOMATIC-CONTROL APPARATUS FOR TELEVISION RECEIVERS

Donald Richman, Flushing, N. Y., assignor to Hazeltine Research, Inc., Chicago, Ill., a corporation of Illinois Application July 21, 1950, Serial No. 175,193

11 Claims. (Cl. 178—7.5)

*General*

Figure 1:
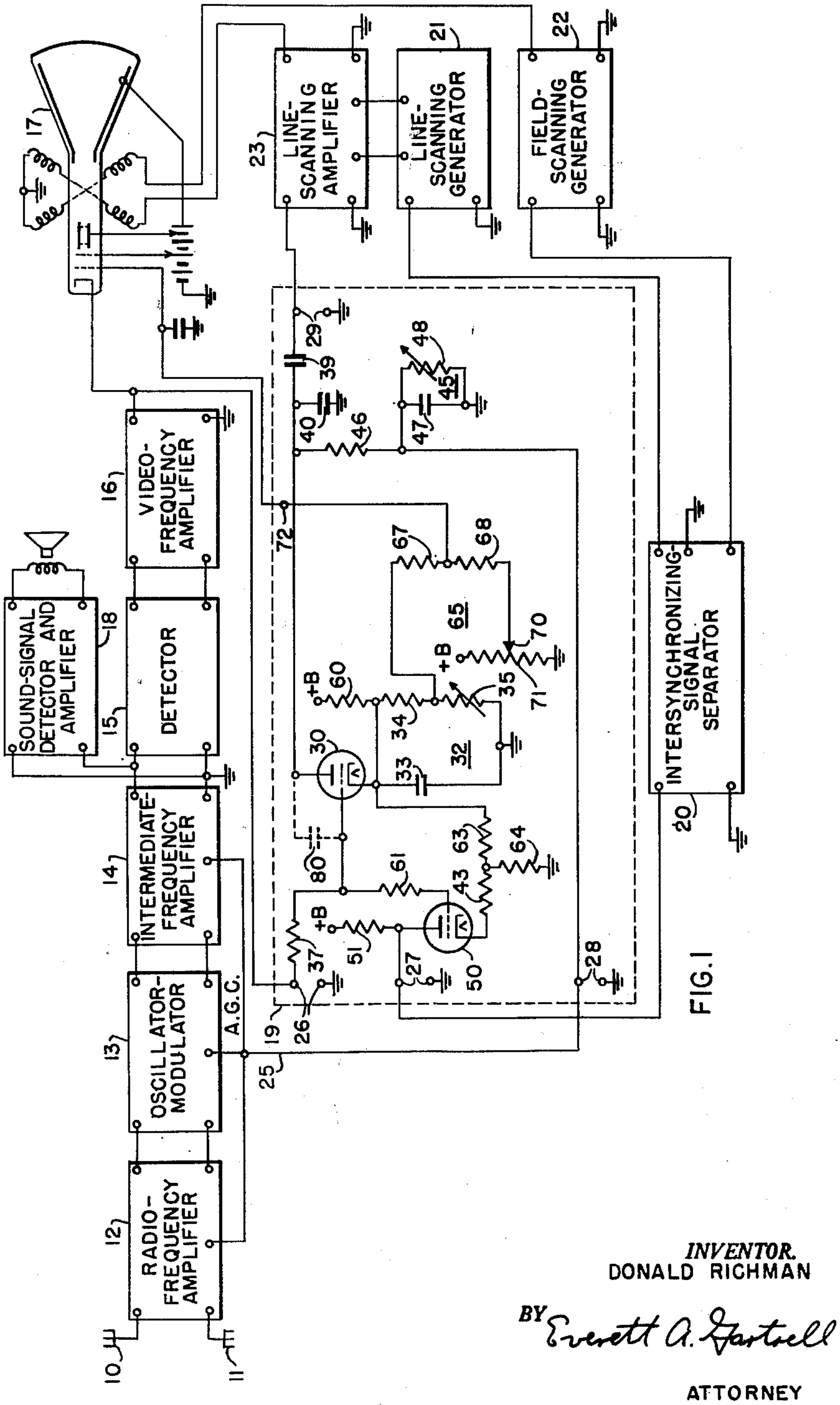

This invention relates to control apparatus and, more particularly, to apparatus for automatically controlling one or more operating characteristics of television receivers. The invention is especially directed to automatic shade-level control apparatus, conventionally referred to as automatic black-level stabilizing apparatus, for maintaining the black level of a television signal applied to the image-reproducing device of the television receiver at a substantially constant amplitude regardless of changes in the intensity of the received carrier-wave signal.

In accordance with present-day television practice, a transmitted television signal comprises a carrier-wave signal which is modulated during trace intervals by video-frequency and steady-state components respectively representative of light variations in an image being transmitted and also of its average background illumination. During the intervening retrace intervals, the carrier signal includes pedestal portions having a predetermined amplitude level corresponding to a given shade, which is usually black. The carrier signal is modulated during a portion of this retrace interval by synchronizing-signal components which correspond to the initiations of successive lines and fields in the scanning of the image.

At the receiver an electron beam of an image-reproducing tube is so deflected as to scan a target or screen in a series of parallel lines. The synchronizing-signal components of the received signal are separated from the other modulation-signal components and are utilized to control the scanning apparatus of the receiver so as to synchronize its operation with that of similar apparatus employed at the transmitter in developing the signal. The intensity of the electron beam is controlled by the video-frequency modulation components, thereby to reconstruct the image.

One of the functions preferably performed by a television receiver is the establishment therein of a fixed amplitude or signal level corresponding to a fixed shade level which is usually black. Such a function is conveniently referred to as black-level control or stabilization. This is to ensure, despite any changes in the intensity in the translated signal, that all video-frequency modulation components thereof which correspond to the fixed shade level and thus have the aforesaid fixed amplitude will be reproduced with the correct shade in the reproduced image so that the light gradations from black to white represented by various other light-modulation values will be properly represented in the reconstructed image.

Some black-level stabilization apparatus heretofore employed in television receivers have stabilized a translated video signal with respect to a fixed reference level established by the tips of the synchronizing-signal components. Since the synchronizing-signal components are superimposed on the black-level pedestal portions of the television signal, the above-mentioned components extend into a region commonly designated as the infrablack or blacker-than-black region. Consequently, in the usual receiver wherein the black level is established from the synchronizing-signal components, the light gradations or shades from black to white represented by the various light-modulation components may not always be faithfully represented in the reconstructed image, unless manual adjustment is relied upon mainly to compensate for large changes in the black-level amplitude of the video signal. For example, if the intensity of the received television signal varies due to fading or to a manual adjustment of the receiver gain, the amplitude of the synchronizing-signal components varies and this upsets the action of such a stabilizing system and may require manual readjustment to compensate for the resulting shift of the black level.

Other black-level stabilizing apparatus in television receivers have stabilized with respect to the black-level pedestal components of the video signal. Some such apparatus have accomplished this result by eliminating the synchronizing-signal components by a clipping action. This action has proved generally unsatisfactory due to excessive distortion which is introduced by the clipping operation. Other black-level stabilization systems which operate on the pedestal pulse have required the use of a greater number of components than is desirable for some applications. One such apparatus of the last-mentioned type is disclosed in United States Letters Patent 2,259,538 granted October 21, 1941 to Harold A. Wheeler entitled "Television Receiver With Automatic Shade-Level Control." The apparatus there disclosed is coupled to the cathode of a cathode-ray type of picture tube of a television receiver through a peak rectifier which is normally disabled but is made operative only for brief intervals coincident with the duration of the retrace intervals when the synchronizing-signal components are present. The peak rectifier just mentioned is also coupled to the control electrode of the cathode-ray tube through a feed-back circuit including an electrical bridge circuit and a second peak rectifier. An amplifier is provided in this feed-back circuit in order to develop a black-level stabilizing control effect of sufficient magnitude for application to the cathode-ray tube.

Another black-level stabilizing apparatus, which operates on the black-level pedestal pulse of the applied television signal, includes an arrangement for deriving a control signal of pulse wave form, each pulse of which is initiated in point of time with a corresponding synchronizing pulse component of the applied signal. The control signal is utilized to control the operation of a pair of diode switches which, in turn, control the operation of a peak rectifier system including two pairs of diodes so arranged that a black-level stabilizing control effect is developed which is proportional to the amplitude level of the rear shoulder portions of the pedestal pulses. Manifestly, such an apparatus also requires numerous tubes and other circuit components.

It is particularly desirable that any automatic-control apparatus in a television receiver be relatively insensitive to high-amplitude noise interference which may accompany the received signal. Since that interference often seriously impairs the operation of the apparatus and the various units controlled thereby, the foregoing remark applies not only to synchronizing-signal separating apparatus and automatic-gain-control apparatus but also to automatic black-level stabilizing apparatus. Certain prior automatic-control apparatus such as automatic-gain-control apparatus have been of the synchronous type, that is, of the type which is keyed into operation only during the occurrence of the line-synchronizing pulses of the applied television signal. Since such apparatus is effectively responsive to the applied television signal only during a small percentage of the time, it ordinarily exhibits good immunity to random impulse noise such as occurs in the intervals between the synchronizing-signal components of the received television signal. It would, therefore, appear desirable that the black-level stabilizing system of a television receiver have such a characteristic.

It is an object of the invention, therefore, to provide a new and improved apparatus for automatically controlling an operating characteristic of a television receiver.

It is another object of the present invention to provide a new and improved automatic black-level stabilizing apparatus which avoids one or more of the above-mentioned disadvantages and limitations of prior such apparatus.

It is a further object of the invention to provide for use in a television receiver a new and improved automatic shade-level control apparatus which is extremely simple in construction yet is capable of producing a black-level stabilizing control potential which varies quite accurately with the variations in the intensity of the television signal translated by the receiver.

It is yet another object of the present invention to provide for use in a television receiver a new and improved automatic black-level stabilizing apparatus which is simple in construction, inexpensive to manufacture and which is substantially unaffected by undesired noise appearing between individual line-synchronizing pulses of an applied signal.

In accordance with a particular form of the invention, an apparatus for automatically controlling an operating characteristic of a television receiver including an image-reproducing device having a pair of input electrodes comprises an electron-discharge means having input electrodes including a control electrode and a cathode and output electrodes effectively including an anode and that cathode. The apparatus also includes a circuit coupled to a predetermined one of the input electrodes of the image-reproducing device and to the aforesaid input electrodes of the electron-discharge means for applying thereto a composite modulation signal, the amplitude of which may vary and which includes the original unidirectional components, and undesired random noise pulses and synchronizing pulses having such polarity as to tend to render the electron-discharge means conductive. The automatic-control apparatus further includes an impedance network, connected as a cathode load for the electron-discharge means and including a point thereon remote from the cathode of the electron-discharge means maintained at a fixed reference potential, having a time constant at least several times the period of the synchronizing pulses and responsive to electron discharges between the aforesaid ouput electrodes for deriving a control effect normally maintaining the electron-discharge means in a nonconductive condition. The automatic-control apparatus additionally includes a circuit including a direct-current path connected between the aforesaid anode and the fixed reference point. The apparatus also includes a source of a control signal having an amplitude substantially unaffected by amplitude variations of the synchronizing pulses coupled to the output electrodes for supplying the control signal thereto in synchronous relation with the synchronizing pulses and with such polarity as to develop the aforesaid electron discharges and render the electron-discharge means conductive substantially only during the coincidence of the synchronizing pulses and the control signal, thereby to develop across the aforesaid impedance network the aforesaid control effect having a value related to the peak amplitude of the synchronizing pulses but substantially independent of the undesired noise pulses. The apparatus further includes a resistive impedance network coupled between the fixed potential point and a point on the impedance network intermediate the fixed potential point and the cathode of the electron-discharge means for deriving from the aforesaid control effect a signal having a rate of change with amplitude level of the modulation signal which is substantially equal to that of a predetermined reference shade level thereof and which is substantially independent of the undesired random pulses. The automatic-control apparatus still further includes means coupled to the resistive network for applying the derived signal to the other of the input electrodes of the image-reproducing device for stabilizing the modulation signal applied to the input electrodes thereof with respect to the predetermined shade level.

For a better understanding of the present invention, together with other and further objects thereof, reference is had to the following description taken in connection with the accompanying drawings, and its scope will be pointed out in the appended claims.

Figure 2:
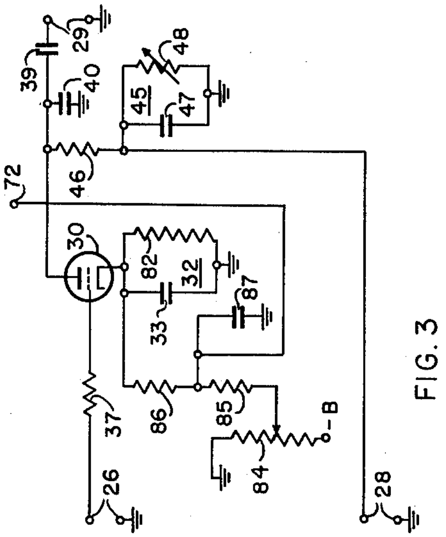
Figure 2:
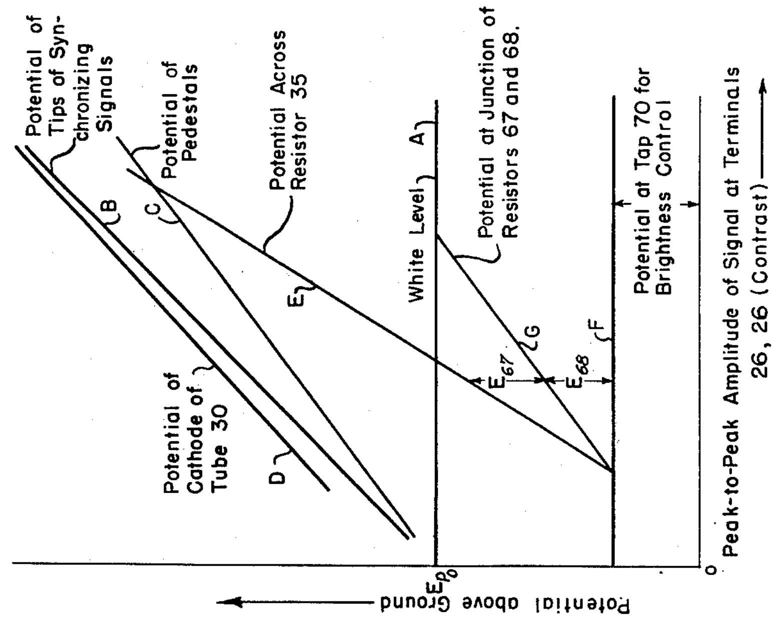

In the accompanying drawings, Fig. 1 is a circuit diagram, partly schematic, of a complete television receiver including a control apparatus in accordance with a particular form of the present invention; Fig. 2 is a graph utilized in explaining the operation of the control apparatus utilized in the Fig. 1 receiver; and Fig. 3 is a circuit diagram of another form of control apparatus in accordance with the invention.

*General description of Fig. 1 Receiver*

Referring now more particularly to Fig. 1 of the drawings, the television receiver there represented comprises a receiver of the superheterodyn type including an antenna system 10, 11 coupled to a radio-frequency amplifier 12 of one or more stages. There is coupled to the latter unit in cascade, in the order named, an oscillator-modulator 13, an intermediate-frequency amplifier 14 of one or more stages, a detector 15, a direct-current video-frequency amplifier 16 of one or more stages and a cathode-ray image-reproducing device 17 of conventional construction provided with the usual line-frequency and field-frequency scanning coils for deflecting the cathode-ray beam in two directions normal to each other. Connected to the output terminals of the intermediate-frequency amplifier 14 is a conventional sound-signal detector and amplifier 18 which comprises the usual frequency detector, amplifier and sound-reproducing device.

An output circuit of the video-frequency amplifier 16 is coupled to an input circuit including input terminals 26, 26 of a control apparatus 19, and an output circuit of the latter including output terminals 27, 27 is coupled to a line-scanning generator 21 and a field-scanning generator 22 through an intersynchronizing-signal separator 20. The output circuit of the generator 21 is coupled in a conventional manner to the line-scanning coil of the image-reproducing device 17 through a line-scanning amplifier 23 while the field-scanning generator 22, which may include suitable amplifiers, is connected to the field-scanning coil of the image-reproducing device. An output circuit of the line-scaning amplifier 23 is connected to input terminals 29, 29 of the control apparatus 19. Output terminals 28, 28 of the control apparatus 19 are connected to the input circuits of one or more of the stages of units 12, 13 and 14 by a control circuit conductor 25 to supply an automatic-gain-control or A. G. C. effect to those stages. The units 10–23, inclusive, with the exception of the apparatus 19, a portion of which is constructed in accordance with the present invention and will be described in detail hereinafter, may be of conventional construction and operation so that a detailed description and explanation of the operation thereof are unnecessary herein.

*General operation of Fig. 1 Receiver*

Considering briefly, however, the general operation of the above-described receiver as a whole, television signals intercepted by the antenna system 10, 11 are selected and amplified in the radio-frequency amplifier 12 and are supplied to the oscillator-modulator 13 wherein they are converted into intermediate-frequency signals. The latter, in turn, are selectively amplified in the intermediate-frequency amplifier 14 and are delivered to the detector 15. The modulation components of the signal are derived by the detector 15 and are applied to the video-frequency amplifier 16 wherein those components including the original undirectional components are amplified and from which they are supplied to the input circuit of the image-reproducing device 17.

A control voltage, which is derived by an automatic-gain-control supply in the unit 19, in a manner fully explained in applicant's copending application Serial No. 175,191, filed concurrently herewith and entitled "Control Apparatus For Television Receivers," is applied by the control circuit conductor 25 as an automatic-amplification-control bias to the gain-control circuits of units 12, 13 and 14 to maintain the signal input within a relatively narrow range for a wide range of received signal intensities. The unit 19 also selects the synchronizing signals from the other modulation components of the composite video-frequency signal applied thereto by the video-frequency amplifier 16 in a manner also more fully explained in applicant's above-identified copending application. The line-synchronizing and field-synchronizing signals derived by the unit 19 are applied by the terminals 27, 27 to the intersynchronizing-signal separator 20 wherein they are separated from each other and are then supplied to individual ones of the generators 21 and 22 to synchronize the operation thereof. An electron beam is produced by the cathode-ray image-reproducing device 17 and the intensity of this beam is controlled in accordance with the video-frequency signal and control voltages impressed on the brilliancy control electrode thereof. Saw-tooth-current waves are generated in the line-frequency and field-frequency generators 21 and 22 respectively. The output signal of the generator 21 is supplied to the line-scanning coil of unit 17 through the amplifier 23 while the output signal of the generator 22 is supplied directly to the field-scanning coil of device 17 to produce the usual scanning fields, thereby to deflect the cathode-ray beam of device 17 in two directions normal to each other to trace a rectilinear scanning pattern on the screen of the tube and thereby reconstruct the translated picture.

The audio-frequency modulation components of the received signal are derived in the conventional manner by the sound-signal detector and amplifier 18 and are applied to the loudspeaker thereof and converted to sound.

*Description of control apparatus of Fig. 1*

Referring now more particularly to Fig. 1 of the drawings, the automatic-control or black-level stabilizing apparatus 19 for the television receiver includes an electron-discharge means such as a triode 30 which is so arranged as to have at least two operating conditions which are more fully to be described hereinafter. The apparatus 19 includes an impedance or integrating network 32 which has a relatively high impedance and is connected between the cathode of the triode and a fixed reference potential point such as ground and, hence, appears in series relation with the space-current path of the tube. This network comprises an energy-storage device in the form of a condenser 33 which is connected in parallel with a pair of series-connected resistors 34 and 35. The resistor 35 is adjustable for controlling the magnitude of the cathode current of the tube 30 and the contrast of the image reproduced by image-reproducing device 17 of the television receiver in a manner which will be described subsequently. A unidirectional source of potential indicated as +B is connected to the cathode of the tube 30 through a voltage divider including a resistor 60 and the resistors 34 and 35 for developing a suitable bias on the cathode of the tube. The network 32 preferably has a time constant which is at least several times the period of the line-synchronizing signal components applied to the input terminals 26, 26 of unit 19.

The apparatus 19 further includes means coupled to the input electrodes of the tube 30 including the control electrode thereof for applying thereto the composite modulation or video-frequency signal derived by the detector 15, the amplitude of which signal may vary and which effectively includes picture components, black-level pedestals, at least one type of synchronizing-signal components, namely the line-synchronizing signal components, and the original unidirectional components representative of light variations and which may include undesired random noise pulses at least some of which may have an amplitude greater than the amplitude of the synchronizing-signal components. The line-synchronizing components are more positive than the picture components and tend to convert the tube 30 from one operating condition to another. The means just mentioned comprises the input terminals 26, 26 which are connected to the input circuit of the video-frequency amplifier 16 and also comprises a current-limiting resistor 37 connected between the high-potential one of those terminals and the control electrode of tube 30.

The apparatus also includes a source of a control signal having an amplitude substantially unaffected by amplitude variations of the synchronizing-signal components derived by the receiver and a circuit for supplying the aforesaid control signal to one of the electrodes of the tube 30, specifically to the anode thereof, in synchronous relation with the application of the line-synchronizing signal components to the control electrode and with such polarity as to convert the tube from one operating condition to another substantially only during the intervals of the line-synchronizing signal components, thereby to develop across the network 32, in a manner to be explained subsequently, a control effect related to the peak amplitude of the line-synchronizing signal components but substantially independent of the accompanying undesired random pulses. This control-signal source comprises an input circuit including the input terminals 29, 29 which are coupled to an output circuit by the line-scanning amplifier 23 and to the tube 30 through a coupling condenser 39. A condenser 40 is connected between the anode of the tube 30 and ground and effectively constitutes the input impedance of that circuit. The high-potential one of the terminals 29, 29 is preferably coupled to a suitable point in the line-scanning amplifier 23 such as the anode of the amplifier tube where there is developed, in a conventional manner during each line-retrace interval, a relatively high-amplitude, short-duration impulse of positive polarity. The well-known characteristics, such as the Q of the tuned circuits of the generator 21 and its amplifier 23, are such that the positive output pulse applied to the terminals 29,29 has an amplitude which is substantially unaffected by amplitude variations or temporary loss of the synchronizing-signal components applied to the terminals 26, 26 of unit 19 from the video-frequency amplifier 16.

In accordance with a feature of the invention fully described and explained in applicant's copending application Serial No. 176,410, filed concurrently herewith and entitled "Automatic-Control Apparatus," a condenser 80, which is represented in broken-line construction since it may be comprised in whole or in part of the anode-control electrode capacitance of the tube 30 and the inherent capacitance of the connections to those electrodes, is connected between the anode and the cathode of the tube.

The control apparatus 19 additionally includes a parallel-connected resistor 48 and condenser 47 forming a second impedance network 45 which, like the network 32, has developed thereacross a control effect having a value proportional to the space or cathode current of the tube 30 and related to the peak amplitudes of the line-synchronizing signal components but substantially independent of the undesired random pulses. One terminal of the network 45 is coupled to the anode of the tube 30 through a resistor 46 while the other terminal thereof is connected to a point of fixed potential such as ground. The network 45 and the resistor 46 constitute a direct-current path between the anode of the tube 30 and ground. The junction of the network 45 and the resistor 46 is connected to the automatic-gain-control output terminals 28, 28 of the unit 19. The network 45 is preferably proportioned to have a time constant at least several times the interval between the line-synchronizing pulses. The operating potentials developed and applied to the tube 30, in particular that developed across the network 32, are such that it is normally nonconductive.

The unit 19, in accordance with a feature of the invention described and claimed in applicant's first-mentioned copending application, also includes a rectifier device which may be in the form of a triode 50 for deriving at the anode thereof synchronizing-signal components which are substantially independent of the undesired random pulses and which have an amplitude substantially independent of any amplitude variations of the video-frequency signals applied to the terminals 26, 26. The control electrodes of the tubes 30 and 50 are interconnected through a resistor 61. The anode of the tube 50 is connected to a source of potential +B through a load resistor 51 and is also connected to the high-potential one of the output terminals 27, 27. A positive bias potential, which is effective normally to maintain the tube 50 in a nonconductive condition, is applied to the cathode of that tube through a resistor 43 from a voltage divider including resistors 63 and 64 which are connected in series between the cathode of the tube 30 and ground. The resistors 63 and 64 preferably have a resistance which is much greater than that of either of the resistors 34 or 35.

The apparatus 19, in accordance with a feature of the present invention, additionally includes a resistive impedance means or network 65 which is coupled to the network 32 and is responsive to the control effect developed in network 32, this impedance means having parameters so proportioned as to develop between a predetermined portion of the network and a reference point thereon and, hence, effectively between the high-potential one of the terminals 26, 26 and said point a unidirectional potential having an amplitude which varies in a predetermined manner with relation to variations in the amplitude of the predetermined shade or black-level pedestals or of the synchronizing-signal components but which is substantially independent of the aforesaid undesired random pulses. The impedance network 65 comprises a potential divider including a pair of series-connected resistors 67 and 68 connected across resistor 35 through an adjustable tap 70 of a voltage divider 71 connected to a source indicated +B, this divider serving to control background intensity or brightness of the image produced by the image-reproducing device 17 of the receiver. The junction of the resistors 67 and 68 is connected to an output terminal 72 which is, in turn, connected to the control electrode of the image-reproducing device 17. Each of the resistors 67 and 68 has a value of resistance much greater than that of the contrast 35 and also greater than that of the resistor 71, particularly that portion of the latter between the tap 70 and ground. Although a more exact proportioning of the parameters of the impedance network 65 ordinarily takes into consideration various factors such as the operating characteristics of the tube 30, the variations in the amplitude of the signal and in particular the black level of the signal applied to the terminals 26, 26 for both maximum and minimum settings of the contrast control 35, and also the setting of the tap 70 for brightness control, an approximate determination of the size of the independent resistors 67 and 68 may be arrived at from the following relation, namely that the change in the potential appearing at the terminal 72 is to the change in the potential at the junction of the resistors 34 and 35 as is the value of the resistor 68 divided by the sum of the values of the resistors 67 and 68.

*Operation of Fig. 1 Control apparatus*

In considering the operation of the apparatus 19, it will be assumed initially that the proper operating bias has been established across the network 32 by adjustment of resistor 35 and also by the biases established across the network 45 and the network 32 by a few cycles of operation of the apparatus. As previously mentioned, it will also be assumed that the tube 30 is normally nonconductive and is effective to conduct only during the occurrence of the line-synchronizing pulses. It will be further assumed that the position on the resistor 71 of the tap 70 controlling the brightness of the image reproduced by the device 17 and also that the adjustment of the contrast control 35 cause the device 17 to produce a proper image. As hereinbefore mentioned, the composite video-frequency signal including the usual picture components, the line-synchronizing and field-synchronizing components and the unidirectional components is supplied by the output circuit of the direct-current video-frequency amplifier 16 to the terminals 26, 26 coupled to the control electrode-cathode input circuit of the tube 30. There is also applied to the anode-cathode circuit of that tube by way of the terminals 29, 29 and the coupling condenser 39 a control signal comprising periodic positive polarity gating pulses supplied by the line-scanning amplifier 23. These periodic pulses, which constitute the sole anode energizing potential for the tube 30, are applied to the anode thereof in synchronous relation with, in particular coincident with, the application of the line-synchronizing pulses periodically and momentarily to render the tube 30 conductive, thereby to develop across the network 32, or a portion thereof such as across resistor 35, a control effect or unidirectional potential of positive polarity related to the peak amplitude of the line-synchronizing components. Specifically, the developed potential is proportional to the amplitude of those components and is positive at the cathode of the tube 30. A potential, having a value related to the aforesaid cathode potential but having a negative polarity at the junction of the resistors 46 and 48, is developed across the network 45 since the networks 32 and 45 are both in the same direct-current anode-cathode loop or circuit of the tube 30. The potential developed across the last-mentioned network for application to the output terminals 28, 28 is related to the average direct current drawn from the anode excitation source comprising the terminals 29, 29 and this potential, as will be made clear subsequently, constitutes an automatic-gain-control potential related to the peak value of the composite video-frequency signal applied to the terminals 26, 26. Hence, the potential just mentioned is proportional to the effective amplitude of the carrier component of the television signal intercepted by the antenna system 10, 11 of the receiver and is most effective for its designated purpose.

Considering further the action of the circuit 19 on the signals applied to the terminals 26, 26 and 29, 29, the resistor 37 coupled between one of the terminals 26, 26 and the control electrode of the tube 30 is effective to produce some positive clipping of any noise pulses having an amplitude equal to or greater than the synchronizing pulses. The conjoint action on the tube 30 of the gating pulses and the line-synchronizing pulses is to establish a variable direct-current reference level or positive potential at the cathode of the tube 30, that is, across the network 32. This level is determined by the amplitude of the line-synchronizing pulses. Thus, should the amplitude of the video-frequency signal and, hence, the line-synchronizing pulses, decrease for any reason such as atmospheric disturbances or fading which affects the received wave-signal intensity, the bias developed across the network decreases proportionally so that the average amplitude of potential between the control electrode and the cathode of the tube 30 remains at a level which bears a substantially fixed relationship to the level corresponding to the level of the synchronizing-signal peaks applied to the control electrode of tube 30. Conversely, when the amplitude of the synchronizing-signal pulses increases, the potential appearing across the network 32 increases in proportion to the aforesaidl amplitude increase. Consequently, the reference level or potential established at the cathode of the tube 30, or the potential across a portion of the network 32, varies in accordance with the peak amplitudes of the components of the signal applied to the terminals 26, 26. This in turn keeps the average amplitude of the potential between the control electrode and the cathode at a level which bears a substantially fixed relationship to the level corresponding to the level of the synchronizing-signal peaks applied to the control electrode of tube 30.

Potential changes corresponding to those appearing across the network 32 but of opposite polarity thereto are developed across the network 45. Since the time constant of the network 45 is long with reference to the interval between line-synchronizing pulses, an average potential related to the peak amplitude of the line-synchronizing signal components and, hence, the carrier amplitude, is developed across that network and constitutes an accurate desirable automatic-gain-control potential.

Considering the circuit of the tube 30 from a somewhat different standpoint, the circuit may be regarded for direct-current conditions as being in the nature of a cathode-follower amplifier wherein the potential of the cathode follows that of the control electrode. Thus, the average potential of the cathode of the tube 30 bears a fixed relationship to the instantaneous potential appearing on the control electrode of that tube during the occurrence of a synchronizing-signal pulse. Expressed somewhat differently, the composite video-frequency signal applied to the control electrode-cathode circuit of the tube 30 effectively acts in series with the variable direct-current reference level established at the cathode of the tube or across a selected portion of the network 32. Thus, the circuit of the tube 30 may be considered to constitute a clamping circuit which is effective to clamp the cathode or a selected point on the network 32 such as the junction of the resistors 34 and 35 to a varying reference level. The significance of this feature will be made clear presently.

The resistor network 63, 64, 43 is effective to supply a suitable positive bias to the cathode of the tube 50, thus determining the magnitude of the signal required for application between the control electrode and the cathode of the tube 50 to render it conductive. Since the tube 50 performs a clipping function, the bias just mentioned is selected by suitable proportioning of the resistors 60, 63 and 64 and the selection of the potential +B so that the clipping level is above the maximum amplitude level of the picture-signal components of the composite video-frequency signal. When the tube 50 is rendered conductive, there is developed at its anode and, hence, between the terminals 27, 27 only synchronizing-signal components having approximately constant amplitudes for application to the intersynchronizing-signal separator 20.

The condenser 80 and the primarily resistive impedance of the control electrode-cathode input circuit of the tube 30 comprise a differentiating means which is effective to render the potential developed across the networks 32 and 45 substantially unresponsive to relative phase variations between the signal applied to the anode of the tube 30 and the signal applied to the control electrode of that tube in a manner fully explained in applicant's copending application Serial No. 176,410.

In addition to supplying a synchronizing-signal output signal having an approximately constant amplitude, unit 19 has a low susceptibility to undesired random pulses or noise, in particular to noise occurring during the intervals between applied line-synchronizing pulses. Since short-duration positive pulses are applied to the input terminals 29, 29 of the unit 19 from the line-scanning amplifier 23 to gate or key the tube 30 into conduction, the anode-cathode path through the tube is conductive only for a very small percentage of the time and the resistor 37 so limits the current that can flow from the control electrode to the cathode due to strong noise pulses that the average value of this control-electrode current is normally small in comparison with that of the anode current. Accordingly, random or noise impulses occurring between synchronizing pulses have an inappreciable effect on the operation of the tube 30 and also on the magnitude of the variable bias potentials developed across the networks 32 and 45. Consequently, the automatic-gain-control portion of the unit 19 constitutes a so-called "keyed automatic-gain-control system" which is characterized by its excellent noise immunity and relative freedom from airplane flutter type of fading. Noise impulses having an amplitude equal to or greater than the desired synchronizing pulses are initially reduced by grid-current limiting in the circuit including the resistor 37 and, due to the periodic conductivity of the tube 30 at the line-synchronizing signal rate, the reference level developed at the junction of the resistors 34 and 35 is not appreciably affected by high-amplitude noise appearing in the signal applied to the terminals 26, 26 of the unit 19.

Thus the potential developed between the junction of the resistors 34 and 35 and ground is proportional to the amplitude of the line-synchronizing signal components. This potential is also proportional to the level of pedestals of the composite video-frequency signals applied to the terminals 26, 26 since those pedestals have, in accordance with conventional television practice, an amplitude which is 75 per cent. of the amplitude of the tips of the synchronizing-signal components. The black-level stabilizing action of the unit 19 including the impedance network 65 may now best be understood by a consideration of the graph of Fig. 2. This figure represents graphically, but in somewhat idealized form, the variations in the potentials above ground of various points in the circuit of unit 19 as the peak-to-peak amplitude of the composite video-frequency signal applied by the anode of the video-frequency amplifier tube to the cathode of the device 17, and hence to the input terminals 26, 26, is varied over a range of operating values. Such a variation may be effected by adjustment of the contrast control 35 which also varies the bias applied to the cathode of the tube 50. For example, increasing the value of the resistor 35 reduces the current flow through the tube and, hence the gain-control potential developed by the network 45 for application by the terminals 28, 28 to the preceding stages of the receiver, thereby increasing the amplitude of the signal applied to the terminals 26, 26.

It will be noted in Fig. 2 that curve A, which represents the white level of the composite video-frequency signal, and hence has a relatively fixed amplitude above ground, occurs at a level corresponding to the quiescent voltage $E_{p_0}$ at the anode or high-potential output terminal of the video-frequency amplifier 16 and, hence, at the input terminals 26, 26 of unit 19, assuming 100 per cent. modulation of the received television signal. The tips of the synchronizing signal, which corresponds to 100 per cent. amplitude of the signal applied to the terminals 26, 26, vary in accordance with curve B of Fig. 2. Since the pedestals have an amplitude which is 75 per cent. of the peaks of the synchronizing-signal components, the amplitude of these pedestals or the black level varies with changes in contrast as represented by curve C. Under normal operating conditions, the cathode potential of the tube 30 is several volts more positive than the potential applied to the control electrode thereof. This cathode voltage varies in the manner represented by curve D and gradually approaches curve B as the peak-to-peak value of the applied composite video-frequency signal increases in value, that is, as the contrast of the reproduced image is increased. The potential developed across the contrast control 35 varies in the manner represented by curve E. Curve F is a horizontal line representing the potential appearing at the tap 70 on resistor 71 and thus constitutes the brightness control potential. As a result of the previously described proportioning of the network 65, the potential at the junction of the resistors 67 and 68 and, hence, the potential applied to the control electrode of the image-reproducing device 17 varies in the manner represented by curve G. The vertical separation of curves G and F, designated $E_{68}$ for a particular value of contrast, represents the potential appearing across the resistor 68, while the separation between the curves G and E, designated $E_{67}$ at the same contrast value, represents the potential developed across the resistor 67.

It will be seen from Fig. 2 that curve G is substantially parallel to curve C, the latter representing the black level of the signal applied by the video-frequency amplifier 16 to the cathode of the image-reproducing device 17 with changes in contrast. Curve G remains substantially parallel to curve C despite adjustments of the brightness control 70, 71, such adjustments serving only to shift curve G up or down without changing its slope. Therefore as the pedestals or black level of the signal applied by the video-frequency amplifier 16 to the cathode of the image-reproducing device varies due to changes in amplitude of the received television signal or due to changes in the setting of the contrast control 35, the level of the potential applied to the control electrode of the device 17 varies a corresponding or related amount. Accordingly, the apparatus 19 ensures, despite any changes in the intensity of the signal translated by the main signal-translating channel of the television receiver, that all picture-signal components of the translated signal are reproduced by the image-reproducing device 17 with the correct shade in the reproduced image so that light gradations from black to white are properly represented in that reproduced image. Consequently, the apparatus 19 assures accurate black-level control or stabilization.

Since the control apparatus 19 is realtively insensitive to high-amplitude noise as a result of the tube 30 being conductive for only a small percentage of the time, the automatic black-level stabilization provided by unit 19 is substantially unaffected by that noise.

Thus it will be seen that the network 65 comprises an impedance network for deriving from the control effect developed across at least a portion of the network 32 a signal having a rate of change with the amplitude of the modulation signal which is substantially equal to that of a predetermined shade or black level thereof and which is substantially independent of the undesired random noise pulses. It will also be clear that the connection between the junction of the resistors 67 and 68 and the terminal 72 and also the high-potential one of the terminals 26, 26 constitutes a means for applying the signal derived by the network 65 to the television receiver for stabilizing the modulation signal as applied to the tube 17 at the aforesaid predetermined shade level.

While applicant does not intend to limit the invention to any specific circuit constants, the following constants are given as illustrative of one embodiment of the invention constructed in accordance with the apparatus of Fig. 1:

| | |
|---|---|
| Resistors 34 and 46 | 150 kilohms |
| Resistor 35 | 250 kilohms (max.) |
| Resistor 37 | 10 kilohms |
| Resistor 48 | 100 kilohms (max.) |
| Resistor 60 | 390 kilohms |
| Resistor 61 | 22 kilohms |
| Resistor 67 | 1.5 megohms |
| Resistor 68 | 2.2 megohms |
| Condenser 33 | 0.22 microfarad |
| Condenser 40 | 100 micromicrofarads |
| Condenser 47 | 0.22 microfarad |
| Condenser 80 | About 3 micromicrofarads |
| +B | 250 volts |
| Tube 30 | Type 12AU7 |
| Periodic potential applied to terminals 26, 26. | About 45 volts peak-to-peak. |
| Peak periodic potential applied to anode of tube 30. | About 350 volts |
| Duration of potential applied to anode of tube 30. | About 7½ microseconds |

*Description and operation of Figure 3 apparatus*

Referring now more particularly to Fig. 3 of the drawings, there is represented a circuit diagram of a modified form of automatic black-level stabilizing apparatus which is generally similar to that represented in Fig. 1. The circuit of Fig. 3, however, does not include a synchronizing-signal separator. Corresponding elements in the two figures are designated by the same reference numerals. In place of the adjustable resistor 35 of the Fig. 1 circuit, the Fig. 3 apparatus employs in the cathode circuit of the tube 30 a resistor 82 having a fixed value. The contrast control may be affected by adjusting the value of the resistor 48 in the impedance network 45. To provide between the terminal 72 and a reference point effectively comprising the high-potential one of the terminals 26, 26 for application to the control electrode-cathode circuit of the image-reproducing device 17 a potential which varies properly with reference to changes in the pedestal of the signal applied to the input terminals 26, 26, an impedance means including a source of unidirectional potential of negative polarity —B is connected to the cathode of the tube 30 through a portion of a voltage divider or brightness control 84 and a voltage divider comprising a pair of serially-connected resistors 85 and 86 connected across the network 32. The junction of the resistors 85 and 86 is connected to the terminal 72 and is also provided with a by-pass condenser 87. The resistors 85 and 86 and the setting of the voltage divider 84 are so selected or proportioned that the junction of the resistors 85 and 86 is at a potential which is lower than that of the potential applied to the input termnials 26, 26 and also varies in the proper manner with reference to the pedestals of the signal applied to the last-mentioned terminals to assure the desired black-level stabilization. The operation of the Fig. 3 circuit is similar to that explained in connection with the Fig. 1 apparatus and, hence, need not be represented.

From the foregoing descriptions of the various embodiments of the invention, it will be apparent that automatic-control systems in accordance with the present invention may be employed automatically to control an operating characteristic of a television receiver such as the black-level stabilization thereof. A black-level stabilizing system in accordance with the present invention is extremely simple in construction yet is capable of producing a black-level stabilizing control effect which varies correctly with the intensity of the television signal applied thereto. A black-level stabilizing system in accordance with the invention not only provides a superior black-level stabilizing action, but also is substantially unresponsive to high-amplitude noise appearing between the synchronizing-signal components of the received television signal.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An apparatus for automatically controlling an operating characteristic of a television receiver including an image-reproducing device having a pair of input electrodes comprising: an electron-discharge means having input electrodes including a control electrode and a cathode and output electrodes effectively including an anode and said cathode; a circuit coupled to a predetermined one of the input electrodes of the device and to said input electrodes of said means for applying thereto a composite modulation signal, the amplitude of which may vary and which includes the original unidirectional components, and undesired random noise pulses and synchronizing-signal pulses having such polarity as to tend to render said means conductive; an impedance network, connected as a cathode load for said means and including a point thereon remote from said cathode of said means maintained at a fixed reference potential, having a time constant at least several times the period of said synchronizing pulses and responsive to electron discharges between said output electrodes for deriving a control effect normally maintaining said means in a nonconductive condition; a circuit including a direct-current path connected between said anode and said fixed reference point; a source of a control signal having an amplitude substantially unaffected by amplitude variations of said synchronizing pulses coupled to said output electrodes for supplying said control signal thereto in synchronous relation with said synchronizing pulses and with such polarity as to develop said discharges and render said means conductive substantially only during the coincidence of said synchronizing pulses and said control signal, thereby to develop across said network said control effect having a value related to the peak amplitude of said synchronizing pulses but substantially independent of said undesired noise pulses; a resistive impedance network connected between said fixed potential point and a point on said impedance network intermediate said fixed potential point and said cathode of said means for deriving from said control effect a signal having a rate of change with amplitude level of said modulation signal which is substantially equal to that of a predetermined reference shade level thereof and which is substantially independent of said undesired random pulses; and means coupled to said resistive network for applying said derived signal to the other of the input electrodes of the device for stabilizing the modulation signal applied to the input electrodes thereof with respect to said predetermined shade level.

2. An automatic black-level stabilizing apparatus for a television receiver including an image-reproducing device having a pair of input electrodes comprising: an electron-discharge means having input electrodes including a control electrode and a cathode and output electrodes effectively including an anode and said cathode; a circuit coupled to a predetermined one of the input electrodes of the device and to said input electrodes of said means for applying thereto a composite modulation signal, the amplitude of which may vary and which includes the original unidirectional components, black-level pedestals, and undesired random noise pulses and synchonizing signal pulses having such polarity as to tend to render said means conductive; a resistor connected to said control electrode in series relation in said circuit and responsive to an electron discharge which may be produced between said input electrodes by said noise pulses for limiting the magnitude of the electron discharge therebetween; an impedance network, connected as a cathode load for said means and including a point thereon remote from said cathode of said means maintained at a fixed reference potential, having a time constant at least several times the period of said synchronizing pulses and responsive to electron discharges between said output electrodes for deriving a control effect normally maintaining said means in a non-conductive condition; a circuit including a direct-current path connected between said anode and said fixed reference point; a source of a control signal having an amplitude substantially unaffected by amplitude variations of said synchronizing pulses coupled to said output electrodes for supplying said control signal thereto in synchronous relation with said synchronizing pulses and with such polarity as to develop said discharges and render said means conductive substantially only during the coincidence of said synchronizing pulses and said control signal, thereby to develop across said network said control effect having a value related to the peak amplitude of said synchronizing pulses but substantially independent of said undesired noise pulses; and a resistive impedance network connected between said fixed potential point and a point on said impedance network intermediate said fixed potential point and said cathode of said means for deriving from said control effect a signal having a rate of change with amplitude level of said modulation signal which is substantially equal to that of said pedestals and which is substantially independent of said undesired random pulses; and means coupled to said resistive network for applying said derived signal to the other of the input electrodes of the device for stabilizing the modulation signal applied to the input electrodes thereof with respect to the shade level of said pedestals.

3. An automatic black-level stabilizing apparatus for a television receiver including an image-reproducing device having a pair of input electrodes comprising: an electron-discharge means having input electrodes including a control electrode and a cathode and output electrodes effectively including an anode and said cathode; a circuit coupled to a predetermined one of the input electrodes of the device and to said input electrodes of said means for applying thereto a composite modulation signal, the amplitude of which may vary and which includes the original unidirectional components, black-level pedestals, and undesired random noise pulses and synchronizing-signal pulses having such polarity as to tend to render said means conductive; an impedance network, connected as a cathode load for said means and including a point thereon remote from said cathode of said means maintained at a fixed reference potential, having a time constant at least several times the period of said synchronizing pulses and responsive to electron discharges between said output electrodes for deriving a control effect normally maintaining said means in a nonconductive condition; a circuit including a direct-current path connected between said anode and said fixed reference point; a source of a control signal having an amplitude substantially unaffected by amplitude variations of said synchronizing pulses coupled to said output electrodes for supplying said control signal thereto in synchronous relation with said synchronizing pulses and with such polarity as to develop said discharges and render said means conductive substantially only during the coincidence of said synchronizing pulses and said control signal, thereby to develop across said network said control effect having a value related to the peak amplitude of said synchronizing pulses but substantially independent of said undesired noise pulses; a resistive impedance network connected between said fixed potential point and a point on said impedance network intermediate said fixed potential point and said cathode of said means for deriving from said control effect a signal having an amplitude less than that of said pedestals and having a rate of change with amplitude level of said modulation signal which is substantially equal to that of said pedestals and which is substantially independent of said undesired random pulses; and means coupled to said resistive network for applying said derived signal to the other of the input electrodes of the device for stabilizing the modulation signal applied to the input electrodes thereof with respect to the shade level of said pedestals.

4. An automatic black-level stabilizing apparatus for a television receiver including an image-reproducing device having control electrode and cathode input electrodes comprising: an electron-discharge means having input electrodes including a control electrode and a cathode and output electrodes effectively including an anode and said cathode; a circuit coupled to the cathode electrode of the device and to said input electrodes of said means for applying thereto a composite modulation signal, the amplitude of which may vary and which includes the original unidirectional components, black-level pedestals and undesired random noise pulses and synchronizing-signal pulses having such polarity as to tend to render said means conductive; an impedance network, connected as a cathode load for said means and including a point thereon remote from said cathode of said means maintained at a fixed reference potential, having a time constant at least several times the period of said synchronizing pulses and responsive to electron discharges between said output electrodes for deriving a control effect normally maintaining said means in a nonconductive condition; a circuit including a direct-current path connected between said anode and said fixed reference point; a source of a control signal having an amplitude substantially unaffected by amplitude variations of said synchronizing pulses coupled to said output electrodes for supplying said control signal thereto in synchronous relation with said synchronizing pulses and with such polarity as to develop said discharges and render said means conductive substantially only during the coincidence of said synchronizing pulses and said control signal, thereby to develop across said network said control effect having a value related to the peak amplitude of said synchronizing pulses but substantially independent of said undesired noise pulses; a resistive impedance network connected between said fixed potential point and a point on said impedance network intermediate said fixed potential point and said cathode of said means for deriving from said control effect a signal having an amplitude less than that of said pedestals and having a rate of change with amplitude level of said modulation signal which is substantially equal to that of said pedestals and which is substantially independent of said undesired random pulses; and means coupled to said resistive network for applying said derived signal to the control-electrode input electrode of the device for stabilizing the modulation signal applied to the input electrodes thereof with respect to the shade level of said pedestals.

5. An apparatus for automatically controlling an operating characteristic of a television receiver including an image-reproducing device having a pair of input electrodes comprising: an electron-discharge means having input electrodes including a control electrode and a cathode and output electrodes effectively including an anode and said cathode; a circuit coupled to a predetermined one of the input electrodes of the device and to said input electrodes of said means for applying thereto a composite modulation signal, the amplitude of which may vary and which includes the original unidirectional components, and undesired random noise pulses and synchronizing-signal pulses having such polarity as to tend to render said means conductive; an impedance network, connected as a cathode load for said means and including an adjustable gain control for controlling the cathode current of said means and including a point theron remote from said cathode of said means maintained at a fixed reference potential, having a time constant at least several times the period of said synchronizing pulses and responsive to electron discharges between said output electrodes for deriving a control effect normally maintaining said means in a nonconductive condition; a circuit including a direct-current path connected between said anode and said fixed reference point; a source of a control signal having an amplitude substantially unaffected by amplitude variations of said synchronizing pulses coupled to said output electrodes for supplying said control signal thereto in synchronous relation with said synchronizing pulses and with such polarity as to develop said discharges and render said means conductive substantially only during the coincidence of said synchronizing pulses and said control signal, thereby to develop across said network said control effect having a value related to the peak amplitude of said synchronizing pulses but substantially independent of said undesired noise pulses; an integrating network coupled between said anode and said cathode for automatically deriving a gain-control potential having a value proportional to said cathode circuit and a polarity opposite to that of said control effect; a resistive impedance network connected between said fixed potential point and a point on said impedance network intermediate said fixed potential point and said cathode of said means for deriving from said control effect a signal having a rate of change with amplitude level of said modulation signal which is substantially equal to that of a predetermined reference shade level thereof and which is substantially independent of said undesired random pulses; and means coupled to said resistive network for applying said derived signal to the other of the input electrodes of the device for stabilizing the modulation signal applied to the input electrodes thereof with respect to said predetermined shade level.

6. An automatic black-level stabilizing apparatus for a television receiver including an image-reproducing device having a pair of input electrodes comprising: an electron-discharge means having input electrodes including a control electrode and a cathode and output electrodes effectively including an anode and said cathode; a circuit coupled to a predetermined one of the input electrodes of the device and to said input electrodes of said means for applying thereto a composite modulation signal, the amplitude of which may vary and which includes the original unidirectional components, black-level pedestals, and undesired random noise pulses and synchronizing-signal pulses having such polarity as to tend to render said means conductive; an impedance network including a contrast-control resistor, connected as a cathode load for said means and including a point on said contrast-control resistor thereon remote from said cathode of said means maintained at a fixed reference potential, having a time constant at least several times the period of said synchronizing pulses and responsive to electron discharges between said output electrodes for deriving a control effect normally maintaining said means in a nonconductive condition; a circuit including a direct-current path connected between said anode and said fixed reference point; a source of a control signal having an amplitude substantially unaffected by amplitude variations of said synchronizing pulses coupled to said output electrodes for supplying said control signal thereto in synchronous relation with said synchronizing pulses and with such polarity as to develop said discharges and render said means conductive substantially only during the coincidence of said synchronizing pulses and said control signal, thereby to develop across said network said control effect having a value related to the peak amplitude of said synchronizing pulses but substantially independent of said undesired noise pulses; a resistive impedance network including a plurality of series-connected resistors effectively connected in parallel with said contrast-control resistor for deriving from said control effect a signal having a rate of change with amplitude level of said modulation signal which is substantially equal to that of said pedestals and which is substantially independent of said undesired random pulses; and means coupled to said resistive network for applying said derived signal to the other of the input electrodes of the device for stabilizing the modulation signal applied to the input electrodes thereof with respect to the shade level of said pedestals.

7. An automatic black-level stabilizing apparatus for a television receiver including an image-reproducing device having a pair of input electrodes comprising: an electron-discharge means having input electrodes including a control electrode and a cathode and output electrodes effectively including an anode and said cathode; a circuit coupled to a predetermined one of the input electrodes of the device and to said input electrodes of said means for applying thereto a composite modulation signal, the amplitude of which may vary and which includes the original unidirectional components, black-level pedestals, and undesired random noise pulses and synchronizing-signal pulses having such polarity as to tend to render said means conductive; an impedance network including a contrast-control resistive impedance, connected as a cathode load for said means and including a point on said contrast-control impedance thereon remote from said cathode of said means maintained at a fixed reference potential, having a time constant at least several times the period of said synchronizing pulses and responsive to electron discharges between said output electrodes for deriving a control effect normally maintaining said means in a nonconductive condition; a circuit including a direct-current path connected between said anode and said fixed reference point; a source of a control signal having an amplitude substantially unaffected by amplitude variations of said synchronizing pulses coupled to said output electrodes for supplying said control signal thereto in synchronous relation with said synchronizing pulses and with such polarity as to develop said discharges and render said means conductive substantially only during the coincidence of said synchronizing pulses and said control signal, thereby to develop across said network said control effect having a value related to the peak amplitude of said synchronizing pulses but substantially independent of said undesired noise pulses; a resistive impedance network including a pair of series-connected resistors each having a resistance much greater than that of said contrast-control impedance and effectively connected in parallel therewith for deriving from said control effect a signal having a rate of change with amplitude level of said modulation signal which is substantially equal to that of said pedestals and which is substantially independent of said undesired random pulses; and means coupled to said resistive network for applying said derived signal to the other of the input electrodes of the device for stabilizing the modulation signal applied to the input electrodes thereof with respect to the shade level of said pedestals.

8. An apparatus for automatically controlling an operating characteristic of a television receiver including an image-reproducing device having a pair of input electrodes comprising: an electron-discharge means having input electrodes including a control electrode and a cathode and output electrodes effectively including an anode and said cathode; a circuit coupled to a predetermined one of the input electrodes of the device and to said input electrodes of said means for applying thereto a composite modulation signal, the amplitude of which may vary and which includes the original unidirectional components, and undesired random noise pulses and synchronizing-signal pulses having such polarity as to tend to render said means conductive; an impedance network, connected as a cathode load for said means and including a point thereon remote from said cathode of said means maintained at a fixed reference potential, having a time constant at least several times the period of said synchronizing pulses and responsive to electron discharges between said output electrodes for deriving a control effect normally maintaining said means in a nonconductive condition; a circuit including a direct-current path connected between said anode and said fixed reference point; a source of a control signal having an amplitude substantially unaffected by amplitude variations of said synchronizing pulses coupled to said output electrodes for supplying said control signal thereto in synchronous relation with said synchronizing pulses and with such polarity as to develop said discharges and render said means conductive substantially only during the coincidence of said synchronizing pulses and said control signal, thereby to develop across said network said control effect having a value related to the peak amplitude of said synchronizing pulses but substantially independent of said undesired noise pulses; and a resistive impedance network including a background intensity control for said device connected between said fixed potential point and a point on said impedance network intermediate said fixed potential point and said cathode of said means for deriving from said control effect a signal having a rate of change with amplitude level of said modulation signal which is substantially equal to that of a predetermined reference shade level thereof and which is substantially independent of said undesired random pulses; and means coupled to said resistive network for applying said derived signal to the other of the input electrodes of the device for stabilizing the modulation signal applied to the input electrodes thereof with respect to said predetermined shade level.

9. An apparatus for automatically controlling an operating characteristic of a television receiver including an image-reproducing device having a pair of input electrodes comprising: an electron-discharge means having input electrodes including a control electrode and a cathode and output electrodes effectively including an anode and said cathode; a circuit coupled to a predetermined one of the input electrodes of the device and to said input electrodes of said means for applying thereto a composite modulation signal, the amplitude of which may vary and which includes the original unidirectional components, and undesired random noise pulses and synchronizing-signal pulses having such polarity as to tend to render said means conductive; an impedance network including a first pair of series-connected resistors coupled in parallel with a condenser, connected as a cathode load for said means and including a point on one of said resistors remote from said cathode of said means maintained at a fixed reference potential, having a time constant at least several times the period of said synchronizing pulses and responsive to electron discharges between said output electrodes for deriving a control effect normally maintaining said means in a nonconductive condition; a circuit including a direct-current path connected between said anode and said fixed reference point; a source of a control signal having an amplitude substantially unaffected by amplitude variations of said synchronizing pulses coupled to said output electrodes for supplying said control signal thereto in synchronous relation with said synchronizing pulses and with such polarity as to develop said discharges and render said means conductive substantially only during the coincidence of said synchronizing pulses and said control signal, thereby to develop across said network said control effect having a value related to the peak amplitude of said synchronizing pulses but substantially independent of said undesired noise pulses; a resistive impedance network including a least a second pair of series-connected resistors effectively connected in parallel with said one of said first pair of resistors and having a resistance much greater than that of said first pair for deriving from said control effect a signal having a rate of change with amplitude level of said modulation signal which is substantially equal to that of a predetermined refernce shade level thereof and which is substantially independent of said undesired random pulses; and means coupled to said resistive network for applying said derived signal to the other of the input electrodes of the device for stabilizing the modulation signal applied to the input electrodes thereof with respect to said predetermined shade level.

10. An apparatus for automatically controlling an operating characteristic of a television receiver including an image-reproducing device having a pair of input electrodes comprising: an electron-discharge means having input electrodes including a control electrode and a cathode and output electrodes effectively including an anode and said cathode; a circuit coupled to a predetermined one of the input electrodes of the device and to said input electrodes of said means for applying thereto a composite modulation signal, the amplitude of which may vary and which includes the original unidirectional components, and undesired random noise pulses and synchronizing-signal pulses having such polarity as to tend to render said means conductive; an impedance network, connected as a cathode load for such means and including a point thereon remote from said cathode of said means maintained at a fixed reference potential, having a time constant at least several times the period of said synchronizing pulses and responsive to electron discharges between said output electrodes for deriving a control effect normally maintaining said means in a nonconductive condition; a circuit including a direct-current path connected between said anode and said fixed reference point; a source of a control signal having an amplitude substantially unaffected by amplitude variations of said synchronizing pulses coupled to said output electrodes for supplying said control signal thereto in synchronous relation with said synchronizing pulses and with such polarity as to develop said discharges and render said means conductive substantially only during the coincidence of said synchronizing pulses and said control signal, thereby to develop across said network said control effect having a value related to the peak amplitude of said synchronizing pulses but substantially independent of said undesired noise pulses; a source of unidirectional potential of negative polarity and a resistive impedance network connected between said source and said cathode for deriving between an intermediate point on said resistive network and said fixed potential point from said control effect a signal having a rate of change with amplitude level of said modulation signal which is substantially equal to that of a predetermined reference shade level thereof and which is substantially independent of said undesired random pulses; and means coupled to said resistive network for applying said derived signal to the other of the input electrodes of the device for stabilizing the modulation signal applied to the input electrodes thereof with respect to said predetermined shade level.

11. An apparatus for automatically controlling an operating characteristic of a television receiver including an image-reproducing device having a pair of input electrodes comprising: an electron-discharge means having input electrodes including a control electrode and a cathode and output electrodes effectively including an anode and said cathode; a circuit coupled to a predetermined one of the input electrodes of the device and to said input electrodes of said means for applying thereto a composite modulation signal, the amplitude of which may vary and which includes the original unidirectional components, and undesired random noise pulses and synchronizing-signal pulses having such polarity as to tend to render said means conductive; an impedance network, connected as a cathode load for said means and including a point thereon remote from said cathode of said means maintained at a fixed reference potential, having a time constant at least several times the period of said synchronizing pulses and responsive to electron discharges between said output electrodes for deriving a control effect normally maintaining said means in a nonconductive condition; a circuit including a direct-current path connected between said anode and said fixed reference point; a source of a control signal having an amplitude substantially unaffected by amplitude variations of said synchronizing pulses coupled to said output electrodes for supplying said control signal thereto in synchronous relation with said synchronizing pulses and with such polarity as to develop said discharges and render said means conductive substantially only during the coincidence of said synchronizing pulses and said control signal, thereby to develop across said network said control effect having a value related to the peak amplitude of said synchronizing pulses but substantially independent of said undesired noise pulses; a source of unidirectional potential of negative polarity and a pair of series-connected resistors connected between said source and said cathode of said means for deriving between the junction of said resistors and said fixed potential point from said control effect a signal having a rate of change with amplitude level of said modulation signal which is substantially equal to that of a predetermined reference shade level thereof and which is substantially independent of said undesired random pulses; and means coupled to said resistive network for applying said derived signal to the other of the input electrodes of the device for stabilizing the modulation signal applied to the input electrodes thereof with respect to said predetermined shade level.

DONALD RICHMAN.

References Cited in the file of this patent

UNITED STATES PATENTS

| Number | Name | Date |
|---|---|---|
| 2,240,600 | Applegarth | May 6, 1941 |
| 2,538,519 | Holst | Jan. 16, 1951 |
| 2,559,038 | Bass | July 3, 1951 |
| 2,564,554 | Anderson | Aug. 14, 1951 |
| 2,593,011 | Cotsworth | Apr. 15, 1952 |

FOREIGN PATENTS

| Number | Country | Date |
|---|---|---|
| 109,480 | Australia | Jan. 18, 1940 |
| 474,266 | Great Britain | Oct. 28, 1937 |
| 845,897 | France | Sept. 4, 1938 |